US012341382B2

(12) United States Patent
Kozarekar et al.

(10) Patent No.: US 12,341,382 B2
(45) Date of Patent: Jun. 24, 2025

(54) HYBRID INTERLOCK AND ADHESIVE ROTOR CORES

(71) Applicant: FORD GLOBAL TECHNOLOGIES, LLC, Dearborn, MI (US)

(72) Inventors: Shailesh Shrikant Kozarekar, Novi, MI (US); Dexiang Dallis Sun, Troy, MI (US); Joel Hetrick, Ann Arbor, MI (US); Devan James Anderson, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 343 days.

(21) Appl. No.: 17/946,141

(22) Filed: Sep. 16, 2022

(65) Prior Publication Data

US 2024/0097514 A1   Mar. 21, 2024

(51) Int. Cl.
*H02K 1/28* (2006.01)
*H02K 1/276* (2022.01)
*H02K 15/03* (2006.01)
*B60L 50/60* (2019.01)

(52) U.S. Cl.
CPC .............. *H02K 1/28* (2013.01); *H02K 1/276* (2013.01); *H02K 15/03* (2013.01); *B60L 50/60* (2019.02)

(58) Field of Classification Search
CPC ......... H02K 1/276; H02K 1/2766; H02K 1/28
See application file for complete search history.

(56) References Cited

U.S. PATENT DOCUMENTS

| 8,035,273 | B2 | 10/2011 | Ionel et al. |
| 8,943,677 | B2 | 2/2015 | Gerstrer et al. |
| 2016/0315509 | A1* | 10/2016 | Mo ........................ H02K 1/165 |
| 2017/0271957 | A1* | 9/2017 | Hanumalagutti ........ H02K 9/19 |
| 2019/0036398 | A1* | 1/2019 | Liang ................... H02K 1/2766 |
| 2020/0083788 | A1* | 3/2020 | Zhu .......................... H02K 1/276 |
| 2021/0119517 | A1* | 4/2021 | Zhu ........................ B32B 38/04 |
| 2022/0014071 | A1 | 1/2022 | Crosby et al. |

FOREIGN PATENT DOCUMENTS

CN   107112824 B   12/2019

OTHER PUBLICATIONS

E-Mobility Engineering, Motor Laminations, May 14, 2022, pp. 1-22.

* cited by examiner

*Primary Examiner* — Gary A Nash
(74) *Attorney, Agent, or Firm* — David B. Kelley; Brooks Kushman P.C.

(57) ABSTRACT

A stacked plurality of alternating laminations and adhesive layers of a rotor are arranged such that each of the adhesive layers bonds an outer periphery of an adjacent pair of the laminations together. Each of the laminations includes a plurality of interlocks, disposed about a central region of the lamination radially inside the outer periphery and lacking presence of any of the adhesive layers, that engage a same adjacent one of the laminations.

11 Claims, 4 Drawing Sheets ial clamp torque transfer applications.

BACKGROUND

Extended drive range technology for electric vehicles, such as battery electric vehicles and plug in hybrid vehicles, continually increases demands on electric motors used for vehicle propulsion. Electric motor rotor and stator cores are manufactured by stamping thin laminations and assembling them together. Two different methods may be used to attach these laminations together: interlocks and adhesive. Because of their strength and ease of design and manufacturing, the adhesive mechanism is generally favored over the interlock mechanism. Yet, even the adhesive mechanism is not without drawbacks.

SUMMARY

An electric machine has a plurality of laminations stacked to form a rotor. Each of the laminations includes a plurality of interlocks disposed about a central region of the lamination and engages a same adjacent one of the laminations. The electric machine also has a plurality of adhesive layers interleaved with the laminations such that each one of the layers is in direct contact with and between an adjacent pair of the laminations and radially outside of the central region.

A rotor has a stacked plurality of alternating laminations and adhesive layers arranged such that each of the adhesive layers bonds an outer periphery of an adjacent pair of the laminations together. Each of the laminations includes a plurality of interlocks, disposed about a central region of the lamination radially inside the outer periphery and lacking presence of any of the adhesive layers, that engage a same adjacent one of the laminations.

A method includes applying a layer of adhesive about each of peripheral outer regions of a plurality of laminations, and stacking the laminations such that interlocks of adjacent ones of the laminations engage with each other and each of the layers is directly between an adjacent pair of the laminations to form a rotor. The interlocks are disposed about central regions of the laminations that are radially inside of the peripheral outer regions.

DETAILED DESCRIPTION

Figure 1:
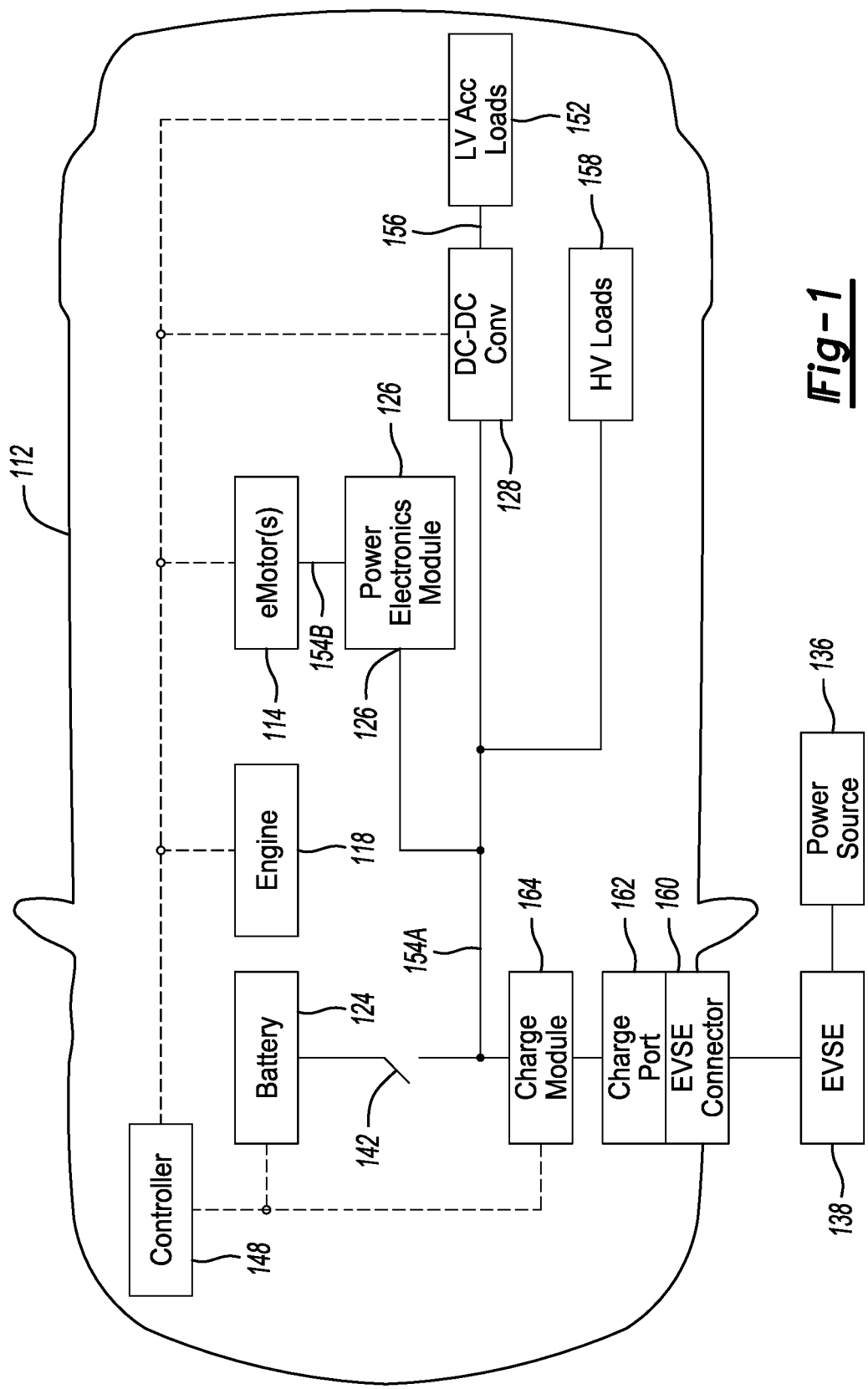
FIG. 1 is a schematic diagram of an example electric vehicle.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Vehicles that use a traction motor drive for propulsion are referred to as electric vehicles (EVs). There are three main classes of electric vehicles. These three classes, which are defined by the extent of their electricity consumption, are namely: Battery Electric Vehicles (BEV), Hybrid Electric Vehicles (HEV), and Plug-In Hybrid Electric Vehicles (PHEV). Battery electric vehicles generally use an external electrical grid to recharge their internal battery and power their electric motors. Hybrid electric vehicles use a main internal combustion engine and a secondary supplemental battery to power their motors. Plug-in hybrid electric vehicles, in contrast to the hybrid electric vehicles, use a main large capacity battery and a secondary internal combustion engine to power their motors. Some plug-in hybrid electric vehicles can also run solely on their internal combustion engine without engaging the motors.

Electric vehicles typically include one or more electric machines. The electric machine may be referred to as an electric motor, a traction motor, or a generator. The electric machine may be a permanent magnet machine or an induction machine. Depending on the operating conditions, the electric machine may be capable of working as a motor or a generator. For example, the electric machine may provide torque for vehicle propulsion or act as a generator for converting mechanical power into electrical power using regenerative breaking technology. The electric machine may also provide reduced pollutant emissions since electric vehicles may be operated in either electric mode or hybrid mode to reduce vehicle fuel consumption. While the present disclosure is described in the context of an electric vehicle, it is to be understood that it may be used in connection with nonautomotive applications. For example, the disclosed electric machine may be used in manufacturing equipment or power-generation machines.

FIG. 1 depicts a Hybrid Electric Vehicle ("HEV") 112. The HEV 112 includes an electrified propulsion system having one or more electric machines 114 mechanically coupled to a hybrid transmission (not shown). In addition, the hybrid transmission is mechanically coupled to an internal combustion engine 118 (i.e., ICE). The electric machines 114 are arranged to provide propulsion torque as well as slowing torque capability either while the engine 118 is operated or turned off. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high voltage bus 154B and the electric machines 114. According to some examples, the traction battery 124 may provide a DC current while the electric machines 114 operate using a three-phase alternating current (AC). The power electronics module 126 may convert the DC current to a three phase. AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery (e.g., 12V battery). The low-voltage loads 152 may be electrically coupled to the low-voltage bus 156. The low-voltage loads 152 may include various controllers within the vehicle 112. One or more high-voltage electrical loads 158 may be coupled to the high-voltage bus 154. The high-voltage electrical loads 158 may further include compressor and electric heaters.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to manage the transfer of energy between the power source 136 and the vehicle 112. The off-board power source 136 may provide DC or AC electric power to the EVSE 138. The EVSE 138 may have a charge connector 160 for plugging into a charge port 162 of the vehicle 112. The charge port 162 may be electrically coupled to an on-board power conversion module or a charge module 164. The charge module 164 may condition the power supplied from the EVSE 138 to provide proper voltage and current levels to the traction battery 124.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components such as governing electrical flow to and from the one or more electric machines.

Figure 2:
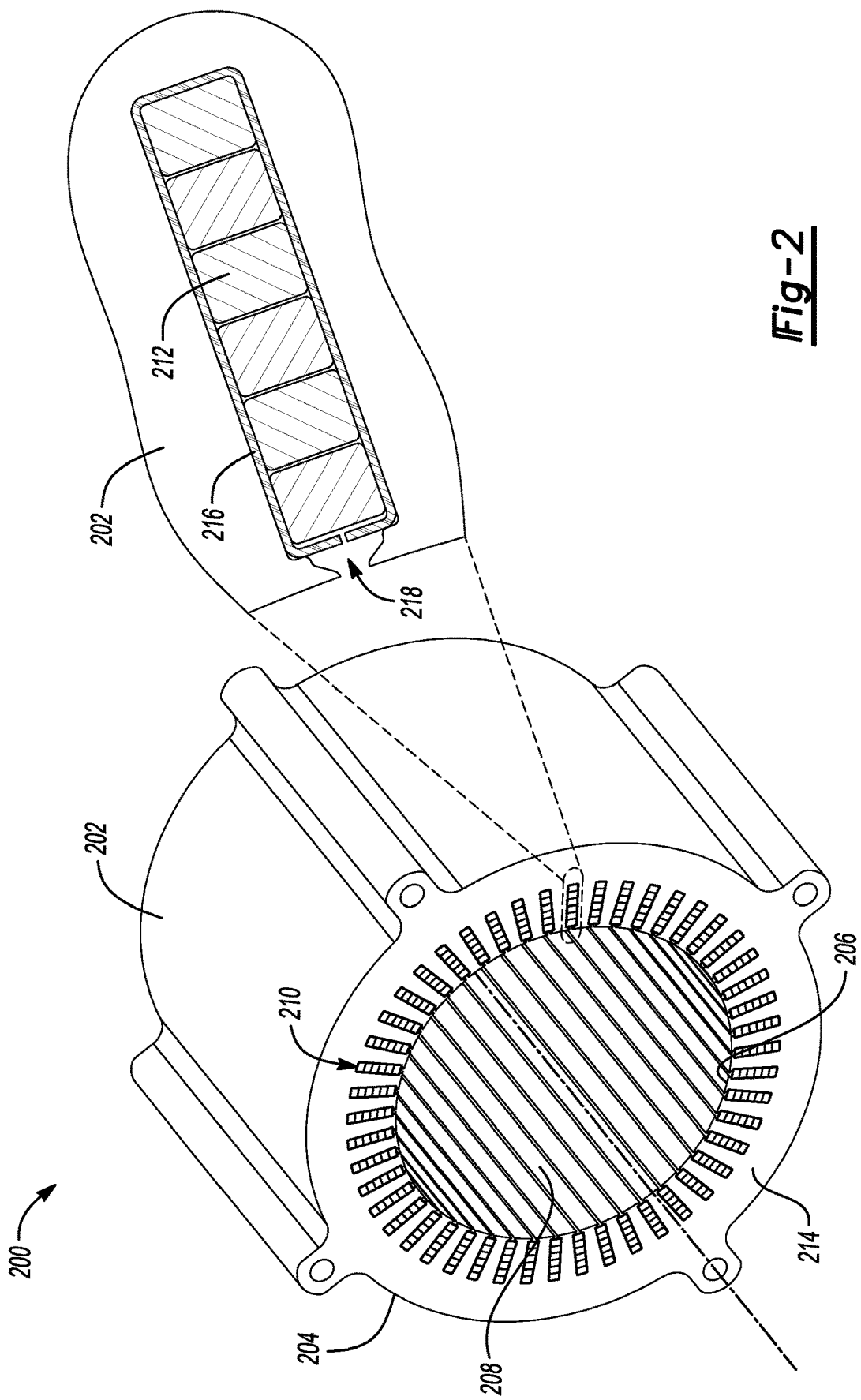
FIG. 2 is a perspective view of a stator with an exploded view of a stator slot.

An electric machine may comprise a stator and a rotor, for example, for propulsion of an electric vehicle. FIG. 2 depicts an exploded view of a stator 200. The stator 200 may comprise a plurality of laminations (not shown) having a front side and a back side. When stacked, the front and back sides are disposed against adjacent front and back sides to form a stator core 202. Each lamination also includes an outer diameter (or outer wall) 204 and an inner diameter (or inner wall) 206. The outer diameters cooperate to define an outer surface of the stator 200, and the inner diameters cooperate to define a bore 208.

The stator core 202 may include a number of slots 210 spaced about a circumference of the stator core 202. A plurality of windings (also known as coils, wires, or conductors) 212 may be wrapped around the stator 200 and are disposed within the stator slots 210. The windings 212 may be routed throughout the slots 210 in a serpentine fashion to create one or more winding paths to transmit current through the stator 200. Based on the arrangement of the windings 212, portions of the windings may protrude from an end face 214 of the stator core 202. In some specific examples, the windings 212 comprise copper hairpin windings that are routed throughout an iron alloy stator core. A plurality of individual hairpins may be inserted axially through slots 210 and have end portions that protrude beyond end face 214 to adjoin hairpins in adjacent slots. The slots 210 may further comprise at least one slot liner 216 to provide insulation between the at least one winding 212 and the stator 200. The at least one slot liner 216 may be made of multiple layers of specialized paper, plastic, or the like for optimal dielectric and mechanical strength. To maximize efficiency, typically, only a minimum clearance necessary to insert the conductors 212 is left as free space. The slots 210 may also further comprise a plurality of non-magnetic wedges (not shown) which may occupy space 218 between the conductors 212 and an inner diameter surface of the stator 200.

Figure 3:
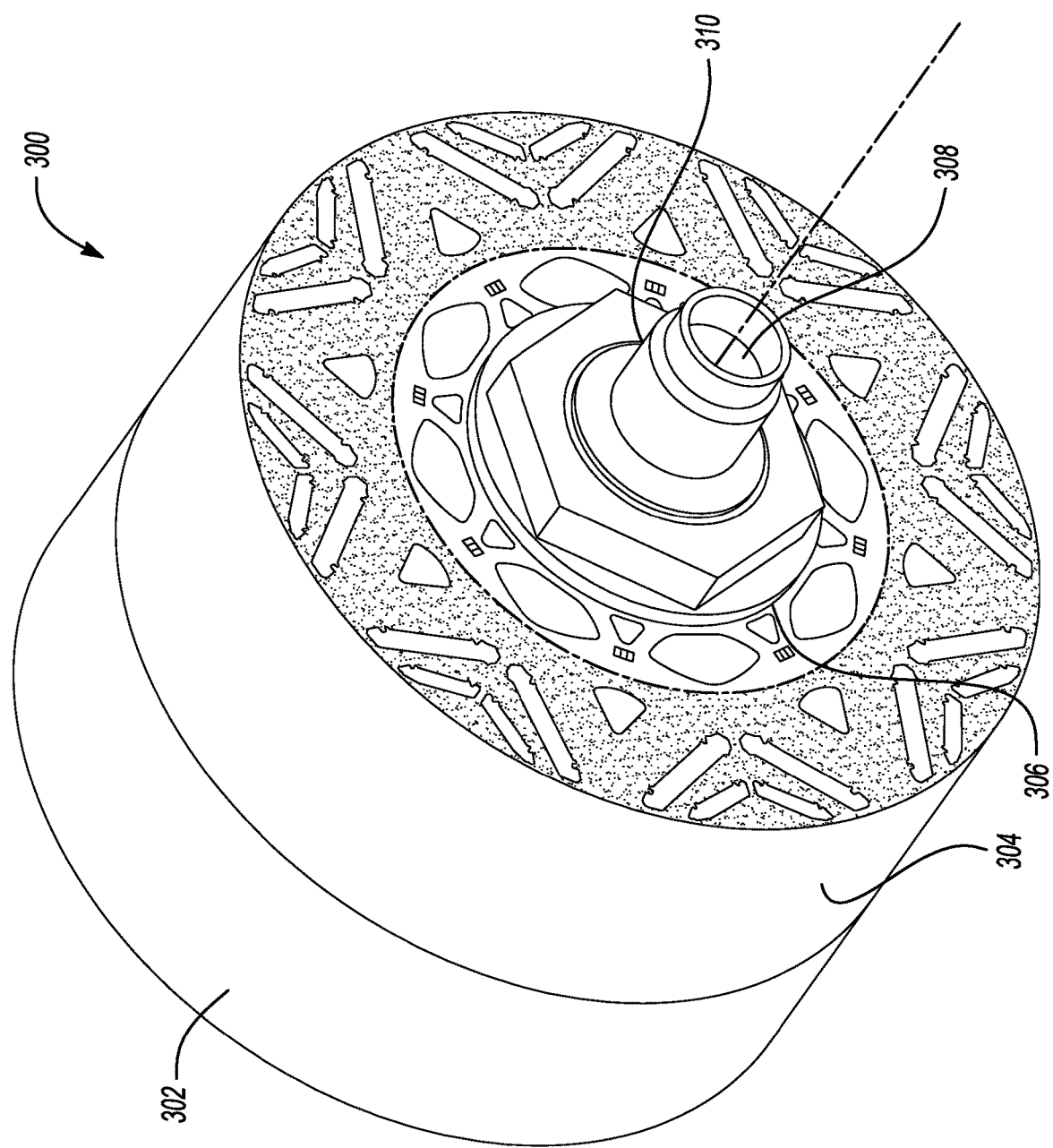
FIG. 3 is a perspective view of a core.

FIG. 3 depicts an exploded view of a rotor 300. Like the stator 200, the rotor 300 may comprise a plurality of laminations (not shown) having a front side and a back side. When stacked, the front and back sides are disposed against adjacent front and back sides to form a rotor core 302. Each lamination also includes an outer diameter (or outer wall) 304 and an inner diameter (or inner wall) 306. The outer diameters cooperate to define an outer surface of the rotor 300, and the inner diameters cooperate to define a second bore 308. The rotor 300 may also include or house a shaft 310.

Two different methods may be used to attach rotor laminations together: interlocks and adhesive. Because of their comparable strength and dimensional accuracy in design and manufacturing, the adhesive mechanism is generally favored over the interlock mechanism. The adhesive mechanism, however, is not without drawbacks. By adding polymers to the stack in the form of thin adhesive applications between each lamination the rotor core 302 takes on viscoelastic properties such as creep.

More specifically, as stated, an assembled electric machine generally includes a shaft in addition to the stator and the rotor. The rotor transfers torque to the shaft by means of an axial friction joint. A large nut on the rotor shaft is driven down clamping the rotor core between the shaft and nut. This clamped joint transfers the torque and will not slip so long as the clamp force is maintained. While clamped steel typically creates a reliable joint, when adhesives are used to bond the laminations which form the core, the clamped steel tends to loosen in a shorter period. This phenomenon is likely attributable to creep of the adhesive polymer.

To address these drawbacks, a hybrid bonded rotor core may be provided which uses both the interlocking and adhesive mechanisms to stack rotor laminations to form a rotor core. This hybrid technology provides the favorable attributes of the adhesion methodology without weakening the rotor clamped joint. More specifically, to join lamination together, the hybrid bonded rotor core uses interlocks near the inner diameter of the rotor core but uses adhesives near the outer diameter of the rotor core. This effectively removes the viscoelastic properties (creep) of adhesives from the clamped joint.

Figure 4:
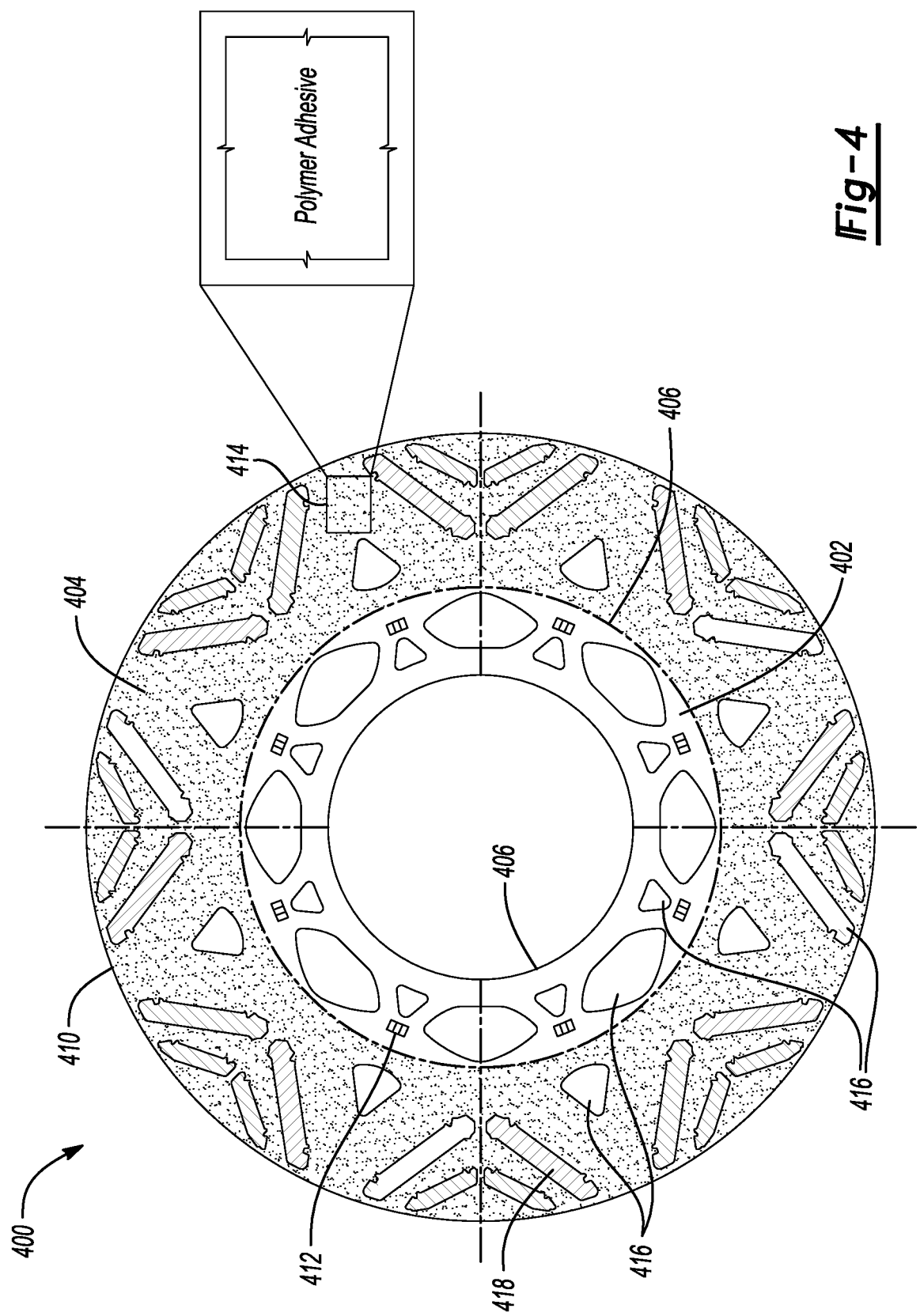
FIG. 4 is a cross-sectional view of the core.

FIG. 4 depicts a cross sectional view of the rotor core 302 representing a lamination 400. The lamination 400 comprises a central region 402 and a peripheral region 404 wherein the peripheral region 404 is radially outside the central region 402. The exemplary line 406 demarcates the separation of the central region 402 from the peripheral region 404. The transition from the central region 402 to peripheral region 404, shown via the exemplary line 406, may occur at any radius relative to the center of the rotor core. In some embodiments, the distance between the exemplary transition line 406 to inner wall 408 of the lamination 400 is equal to the distance between the exemplary transition line 406 and outer wall 410 of the lamination 400. In other embodiments, the distance between the exemplary transition line 406 to inner wall 408 of the lamination 400 may be less or more than the distance between the exemplary transition line 406 and outer wall 410 of the lamination 400.

The lamination 400 further comprises a plurality of interlocks 412 disposed about the central region 402 of the lamination 400 and a plurality of adhesive layers 414 coating the peripheral region 404 of the lamination layer 400. The plurality of interlocks 412 disposed about the central region 402 of the lamination 400 may be configured to engage an adjacent lamination to collectively form a rotor core. Similarly, the plurality of adhesive layers 414 may be interleaved with adjacent laminations such that each one of the layers 414 is in direct contact with and between an adjacent pair of the laminations.

The lamination 400 may further comprise a plurality of cavities 416 such that when stacked, the cavities 416 axially align to form pockets. In some embodiments, at least some of the cavities 416, and in turn the pockets, are configured to receive magnets 418. The cavities 416 configured to receive the magnets 418 are, in some embodiments, outside the central region 402 of the lamination 400.

Accordingly, an electric machine comprising a plurality of laminations stacked to form a rotor is disclosed. Each of said laminations include a plurality of interlocks disposed about a central region of the lamination and configured to engage a same adjacent one of the laminations. In some embodiments, the interlocks are spread evenly about the central region of the laminations. The electric machine further comprises a plurality of adhesive layers interleaved with the laminations such that each one of the layers is in direct contact with and between an adjacent pair of the laminations and radially outside of the central region. In some embodiments, a material of the adhesive layers is epoxy.

In some embodiments, each of the laminations further comprise a plurality of axially aligned cavities which when stacked form one or more pockets. In some embodiments, at least some of the cavities, and in turn at least some of the pockets, are configured to receive one or more magnets. In some embodiments, the one or more cavities which may receive the one or more magnets are in the outer peripheral region of the lamination which is radially outside the central region.

In some embodiments of the present disclosure, a rotor comprising a stacked plurality of alternating laminations and adhesive layers is disclosed. The alternating laminations and adhesive layers are arranged such that each of the adhesive layers bonds an outer periphery of an adjacent pair of the laminations together. In some embodiments, the material of the adhesive layers is epoxy. Similarly, in some embodiments, the laminations further include a plurality of interlocks, disposed about a central region of the lamination configured to engage a same adjacent one of the laminations. The central region of the laminations is radially inside the outer periphery and lacks presence of any of the adhesive layers. In some embodiments, the interlocks are spread evenly about the central region of the lamination.

In some embodiments, the stacked plurality of alternating laminations and adhesive layers further comprise a plurality of axially aligned cavities wherein at least some of the axially aligned cavities are configured to receive a magnet. In some embodiments, the at least some of the cavities that are configured to receive magnets are radially outside of the central region.

The present disclosure further discloses a method comprising the following steps: first, applying a layer of adhesive about each of peripheral outer regions of a plurality of laminations; and second, stacking the laminations such that interlocks of adjacent ones of the laminations engage with each other and each of the layers is directly between an adjacent pair of the laminations to form a rotor. In some embodiments, said interlocks are disposed about central regions of the laminations that are radially inside of the peripheral outer regions. In some embodiments, the method further comprises a third step of inserting magnets into cavities defined by the peripheral outer regions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a plurality of laminations stacked to form a rotor, each of the laminations including a plurality of interlocks disposed about a central region of the lamination and configured to engage a same adjacent one of the laminations; and
a plurality of adhesive layers of epoxy interleaved with the laminations such that each one of the layers is in direct contact with and between an adjacent pair of the laminations and radially outside of the central region.

2. The electric machine of claim 1, wherein the laminations further comprise a plurality of cavities.

3. The electric machine of claim 2, wherein the cavities are axially aligned.

4. The electric machine of claim 3, wherein at least some of the cavities are configured to receive a magnet.

5. The electric machine of claim 4, wherein the cavities configured to receive magnets are radially outside of the central region.

6. The electric machine of claim 1, wherein the interlocks are spread evenly about the central region of the lamination.

7. A rotor comprising:
a stacked plurality of alternating laminations and adhesive layers of epoxy arranged such that each of the adhesive layers bonds an outer periphery of an adjacent pair of the laminations together, wherein each of the laminations includes a plurality of interlocks, disposed about a central region of the lamination radially inside the outer periphery and lacking presence of any of the adhesive layers, configured to engage a same adjacent one of the laminations.

8. The rotor of claim 7, wherein the stacked plurality of alternating laminations and adhesive layers further comprise a plurality of axially aligned cavities.

9. The rotor of claim 8, wherein at least some of the axially aligned cavities are configured to receive a magnet.

10. The rotor of claim 9, wherein the cavities configured to receive magnets are radially outside of the central region.

11. The rotor of claim 7, wherein the interlocks are spread evenly about the central region of the lamination.

* * * * *